3,170,937
Δ³ STEROIDAL COMPOUNDS AND METHOD
FOR PREPARING SAME
Vladimir Petrow, London, England, assignor to
The British Drug Houses Limited
No Drawing. Filed Oct. 2, 1962, Ser. No. 227,725
Claims priority, application Great Britain, Oct. 5, 1961,
35,869/61
14 Claims. (Cl. 260—397.45)

This invention is for improvements in or relating to organic compounds and has particular reference to Δ³-steroidal derivatives.

It is an object of the present invention to provide a process for the preparation of Δ³-derivatives of androstane, 19-norandrostane and D-homo analogues thereof having the general Formula I below employing as starting material the corresponding 3-oxo-Δ⁴-steriod having the general Formula II below. Thus a 3-oxo-Δ⁴-steroid of type (II) is subjected to reduction according to the general procedure of Kisher-Wolff/Huang-Minlon or to chemical equivalents thereof. The general procedure developed by Huang-Minlon (J. Amer. Chem. Soc., 1949, 71, 3301) is preferred. By using the procedure hereinunder defined, Δ³-steroids of type (I) are obtained. This is an unexpected result, as under the apparently similar reaction conditions used by Huang-Minlon (loc. cit.) Δ⁴-steroidal derivatives and *not* Δ³-steroidal derivatives were obtained. Thus testosterone, for example, has been shown by Huang-Minlon to yield the 3-deoxo-Δ⁴-derivative (V), a result in striking contrast to that obtained by the processes described herein and given in detail in Examples 1 to 5 when the 5α- and 5β-Δ³-derivatives are formed.

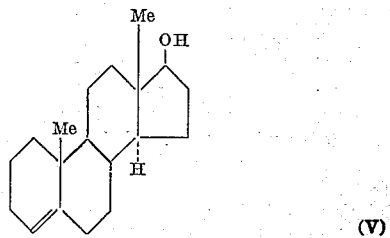

It is a further object of the present invention to provide a new group of alcohols of androstane, 19-nor-androstane and D-homo analogues thereof having the general formula

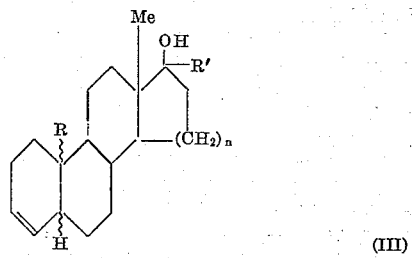

where $n$ is 1 or 2 and where R is H or Me, R′ is an alkyl, alkenyl or aromatic group containing up to 7 carbon atoms or where R and R′ are H or where R is 10α-Me and R′ is H and which may additionally contain Alkyl, alkenyl groups containing up to 3 carbon atoms
Hydroxyl, or alkoxy groups (other than at C–1, 2, 4, 6, 7 and 19)
Oxo group at C–11
Unsaturated linkages (other than Δ¹ and Δ⁶).

We have made the surprising discovery that certain compounds of type (I), and in particular compounds of type (III), are of value on account of their hormonal and antifertility or claudogenic properties. Thus, for example, 17α-methyl-5-androst-3-en-17β-ol is found in the levator ani assay of Eisenberg and Gordon (Endocrinology, 1954, 54, 93) to have approximately twice the anabolic and androgenic activity of methyl testosterone when both compounds are administered, at the 150 mg./kg. dose level, to castrated rats by the oral route. The claudogenic activity of the compounds of the present invention, and in particular compounds of type (III), renders them of value in, for example, the veterinary field. This is an altogether surprising and unexpected discovery as, for example, the formally related 3-deoxo-Δ⁴-alcohols of general Formula IV prepared by de Winter and

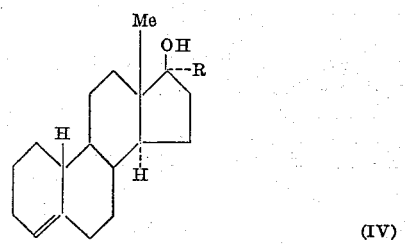

where R=lower alkyl or alkenyl.

Szpilfogel (Chem. and Ind., 1949, 905) not only show no claudogenic activity, but actually maintain pregnancy in sprayed rats (Madjerek, de Visser, van der Vies and Overbeck, Acta Endocrinologica, 1960, 35, 8).

The invention also provides the following specific new compounds:

17α-vinyl-5ξ′-androst-3-en-17β-ol
17α-vinyl-5ξ″-androst-3-en-17β-ol
17α-methyl-5ξ′-androst-3-en-17β-ol
17α-methyl-5ξ″-androst-3-en-17β-ol
4,17α-dimethyl-5ξ′-androst-3-en-17β-ol
4,17α-dimethyl-5ξ″-androst-3-en-17β-ol
6α-methyl-17α-vinyl-5ξ′-androst-3-en-17β-ol
6α-methyl-17α-vinyl-5ξ″-androst-3-en-17β-ol
17α-ethyl-6α-methyl-5ξ′-androst-3-en-17β-ol
17α-ethyl-6α-methyl-5ξ″-androst-3-en-17β-ol
2α-methyl-5ξ′-androst-3-en-17β-ol
2α-methyl-5ξ″-androst-3-en-17β-ol
5ξ′-oestr-3-en-17β-ol
5ξ″-oestr-3-en-17β-ol
17α-vinyl-5ξ′-oestr-3-en-17β-ol
17α-vinyl-5ξ″-oestr-3-en-17β-ol
5ξ′-retro-androst-3-en-17β-ol
5ξ″-retro-androst-3-en-17β-ol
5ξ′-androst-3-ene-11α,17β-diol
5ξ″-androst-3-ene-11α,17β-diol
17β-hydroxy-5ξ′-androst-3-en-11-one
17β-hydroxy-5ξ″-androst-3-en-11-one
5ξ′-androsta-3,9(11)-dien-17β-ol
5ξ″-androsta-3,9(11)-dien-7β-ol
16β-methyl-5ξ′-oestr-3-en-17β-ol
16β-methyl-5ξ″-oestr-3-en-17β-ol
5ξ′-androst-3-ene-16α,17β-diol
5ξ″-androst-3-ene-16α,17β-diol
17β-methyl-D-homo-5ξ′-androst-3-en-17β-ol
17β-methyl-D-homo-5ξ″-androst-3-en-17β-ol The designations 5ξ′ and 5ξ″ represent different isomers, the exact configuration of these isomers being unknown. The wavy line ξ without a prime or double prime is intended to include both isomers.

Claudogenic compounds of type (III) may be administered parenterally, as implants, or by the oral route, which is preferred. Additionally, they may be administered in foods, which may be tinned or otherwise preserved, if so desired. Other modes of administration will be apparent to those skilled in the art.

According to the present invention there is provided a process for the preparation of $\Delta^3$-derivatives of androstane, 19-norandrostane and D-homo analogues thereof, having, apart from additional substituents and unsaturated linkages the general formula

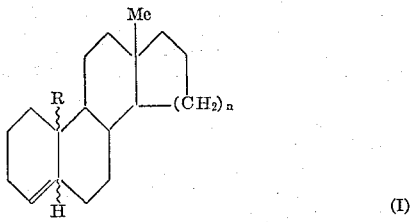

(I)

where R is H or Me, $n$ is 1 or 2 and which may additionally contain alkyl, alkenyl or aryl groups each containing up to 7 carbon atoms (other than at C–3)

Oxo group at C–11.

Hydroxyl, acyloxy or alkoxy groups (other than at C–1, 2, 4, 6, 7 and 19).

Unsaturated linkages (other than $\Delta^1$ and $\Delta^6$) which process comprises converting the corresponding 3-oxo-$\Delta^4$-steroid having the general formula

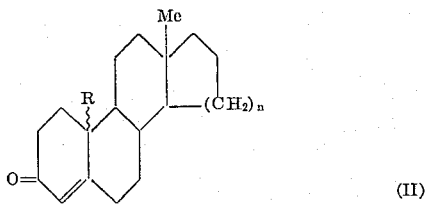

(II)

where R and $n$ have the same meaning as above into its hydrazone or semicarbazone or chemical equivalent thereof and reacting with an alkali metal hydroxide in the presence of an alcohol or in the presence of an alkali metal alkoxide.

In the process of the present invention the 3-oxo-$\Delta^4$-steroid (II) employed as starting material is converted into its hydrazone or semicarbazone or chemical equivalents thereof by methods of prior art (e.g. by reaction with hydrazine hydrate or semicarbazide hydrochloride). The resulting hydrazone or semicarbazone is then submitted to the final stage of reduction. Thus the hydrazone or semicarbazone may be submitted to the action of an alkali metal hydroxide, normally sodium or potassium hydroxide, preferably in the presence of some hydrazine, in an alcoholic solvent which is preferably a polyhydric alcohol such as ethanediol, propane-1,2-diol, propane-1,3-diol, diethylene glycol or triethylene glycol. The reaction is preferably performed in an inert atmosphere such as nitrogen and at a temperature between 160° and 220° C.

Alternatively the hydrazone or semicarbazone may be formed in situ in the polyhydric alcohol, and the resulting solution or suspension of the hydrazone or semicarbazone heated with excess hydrazine and an alkali metal hydroxide. Removal of water and of excess hydrazine by evaporation is permitted during the heating of the mixture up to, for example, 200° C. Thereafter evolution of nitrogen occurs. Heating is continued until evolution of gases (nitrogen) is complete.

The products of the invention may be isolated by any convenient procedure, such, for example, as pouring the cooled reaction mixture into water, extracting the product with a water-immiscible organic solvent such as ether or benzene, evaporating the resulting extract and crystallising or otherwise separating, for example by chromatography onto alumina, the products of the reaction.

In general reduction of the 3-oxo-$\Delta^4$-derivatives (II) by the process of the invention, leads to the formation of a mixture of the $5\alpha$ and $5\beta$-$\Delta^3$-derivatives. One of these isomeric derivatives may sometimes be separated from the reduction mixture by direct crystallisation. Separation of the epimers is generally expeditiously performed by chromatography onto alumina.

The process of the invention is of wide utility and may be applied to the 3-oxo-$\Delta^4$-derivatives of androstane, retroandrostane (or lumi) ($9\beta,10\alpha$-androstane), 19-norandrostane and D-homoandrostane and in particular to the $17\alpha$-methyl, ethyl, propyl, vinyl and propenyl derivatives of testosterone, 19-nortestosterone and their 2-, 4-, and 6-methyl derivatives.

While no unequivocal methods are at present available for determining the configurations at C–5 of the $\Delta^3$-steroidal materials of the present invention, this in no way throws doubt upon the remainder of the structure of the materials, nor is it of relevance insofar as the biological activity of a particular product is concerned. The products are referred to in the succeeding examples where appropriate as $5\xi'$ and $5\xi''$-androstenes, such prefixes being applied to the isomers in the order of their isolation in any particular experiment.

It may be significant that in the case of $17\alpha$-vinyl $5\xi'$- and $17\alpha$-vinyl $5\xi''$-androst-3-en-$17\beta$-ol (see Example 1) the isomer believed to be the $5\alpha$-isomer is more potent as a claudogen than the corresponding $5\beta$-isomer. Although in general it has not proved possible to assign configurations at $C_5$ to the other products of the invention, it is likely that a similar relationship between claudogenic activity and configuration at $C_5$ will exist.

Following is a description by way of example of methods of carrying the invention into effect.

Example 1

$17\alpha$-vinyltestosterone (13 g.), diethylene glycol (260 ml.), potassium hydroxide (10 g.) and 100% hydrazine hydrate (13 ml.) were heated at 100° C. for ½ hour under nitrogen, then the solution temperature was raised slowly to 200° C. This required about 1 hour during which time water vapour and hydrazine were evolved and were permitted to escape from the reaction vessel. Evolution of nitrogen began at approximately 170 to 180° C., and was completed after heating for 1.5 hour at 200° C. The solution was allowed to cool to approximately 120° C. and was then poured into water. The product was extracted with ether, which was washed repeatedly with water, dried ($Na_2SO_4$) and evaporated. The residual semi-solid product was dissolved in hexane (30 ml.) and chromatographed onto alumina (300 g.). Elution with benzene (500 ml. portions) gave eleven fractions which were individually examined by infrared spectroscopy, with the following results:

*Fractions 1 and 2 (1.7 g.).*—I.R. bands at 783 and 679–680 cm.$^{-1}$. The material was essentially a $17\alpha$-vinyl-$5\xi'$-androst-3-en-$17\beta$-ol. $[\alpha]_D^{25}$ about $+16°$ (c., 0.2 in $CHCl_3$).

*Fractions 3 to 6 (5.6 g.).*—I.R. bands at 783 and 679 cm.$^{-1}$ became progressively weaker, and new bands appeared at 774 and 671 cm.$^{-1}$ indicating the presence of an increasing proportion of the second epimer $17\alpha$-vinyl-$5\xi''$-androst-3-en-$17\beta$-ol.

*Fractions 7 to 11 (3.1 g.).*—I.R. bands at 774 and 671 cm.$^{-1}$ due to $17\alpha$-vinyl-$5\xi''$-androst-3-en-$17\beta$-ol. Finally elution with ether gave a further 2.4 g. (fraction 12) of the $5\xi''$-isomer.

Purification of the combined fractions 7 to 12 from light petroleum (B.P. 40 to 60° C.) followed by aqueous methanol (70%) gave $17\alpha$-vinyl-$5\xi''$-androst-3-en-$17\beta$-ol as a flocculent mass of fibrous crystals, M.P. 106 to 108° C., $[\alpha]_D^{24}+39°$ (c., 0.4 in $CHCl_3$). U.V. absorption: $\epsilon_{220}=300$; $\epsilon_{215}=594$; $\epsilon_{210}=634$. I.R. absorption (in $CCl_4$) 3605 (hydroxyl), 3081 (vinyl), 3016 ($\Delta^3$), 1649 ($\Delta^3$) and 1637 cm.$^{-1}$ (vinyl): (in $CS_2$) 998 and 917 (vinyl), 771 and 665 cm.$^{-1}$ ($5\alpha$-$\Delta^3$).

From the I.R. data of McKenna, Norymberski and Stubbs, J.C.S., 1959, 2502 it seems likely that *in this particular instance* the $5\xi'$-isomer is the $5\beta$-androstene derivative, and the $5\xi''$-compound the corresponding $5\alpha$-epimer.

*Claudogenic activity.*—The claudogenic activity of 17α-vinyl-androst-3-en-17β-ol (M.P. 106° to 108° C.) was determined in the following manner:

Female mice, weighing between 24 and 28 g. were employed. The mice were separated into groups of two, and one male added to each cage. Females were examined daily for a vaginal plug which indicated that mating had occurred, and when a plug was present they were removed for experiment.

Groups of mice were used for control and experiment. The experimental group was treated with 50 mg./kg. of 17α-vinyl-androst-3-en-17β-ol, administered daily by stomach tube from the 9th day to the 14th day after mating. Two days after the last administration of steroid the treated and control groups of mice were killed and examined for evidence of a pregnancy.

The following results were obtained:

Control groups—7 out of 8 pregnant
Treated groups—0 out of 10 pregnant

Example 2

Testosterone (20 g.), diethylene glycol (200 ml.), potassium hydroxide (20 g.), and 100% hydrazine hydrate (20 ml.) were stirred together in an open flask under nitrogen and heated at a uniform rate up to 200° C. over 1 hour. The evolved gases (water, hydrazine vapour, and nitrogen) were allowed to escape. The temperature was kept at 200°±5° C. for 2 hours, then the mixture was allowed to cool somewhat and was poured into water. The product was extracted with benzene, which was washed, dried (Na$_2$SO$_4$) and evaporated. Crystallisation of the product from hexane, followed by purification from aqeuous methanol, gave 5ξ″-androst-3-en-17β-ol in needles, M.P. 133 to 135° C. $[\alpha]_D^{25}$+2° (c., 0.54 in CHCl$_3$).

The mother-liquors were subjected to chromatography on alumina. Elution with benzene/ether mixtures gave first a further quantity of 5ε″-androst-3-en-17β-ol followed by 5ξ′-androst-3-en-17β-ol which was purified from methanol to give flakes, M.P. 153 to 155° C. $[\alpha]_D^{25}$+62° (c., 0.32 in CHCl$_3$).

Example 3

Testosterone (20 g.) in methanol (200 ml.) was treated with 85% hydrazine hydrate (25 ml.) under reflux for ½ hour. The mixture was cooled and poured into water, and the precipitated hydrazone was collected and dried. The resulting hydrazone was suspended in triethylene glycol (200 ml.) to which was added sodium hydroxide pellets (20 g.) and 35% hydrazine hydrate (10 ml.). The mixture was heated under nitrogen in an open flask until the temperature reached 200° C. and this temperature was maintained for 2 hours. The products, isolated as in Example 2, were 5ξ″-androst-3-en-17β-ol, M.P. 133 to 135° C., and 5ξ″-androst-3-en-17β-ol, M.P. 153 to 155° C.

Example 4

Testosterone (20 g.), diethylene glycol (200 ml.), potassium hydroxide (10 g.), and semicarbazide hydrochloride (20 g.) were stirred under nitrogen and heated at 100 to 120° C. for 1 hour. More potassium hydroxide (20 g.) was added, and the temperature of the mixture was raised to 200° C., the evolved vapours being allowed to escape. After heating the mixture at 190 to 205° C. for 2 hours, the products were isolated as in Example 2, giving 5ξ′-androst-3-en-17β-ol, M.P. 133 to 135° C., and 5ξ″-androst-3-en-17β-ol, M.P. 153 to 155° C.

Example 5

Testosterone (20 g.), pyridine (10 ml.), semicarbazide hydrochloride (10 g.) and ethanol (100 ml.) were heated under reflux for ½ hour. The mixture was diluted with water to turbidity and allowed to cool. The resulting testosterone semicarbazone was collected and dried, and treated in diethylene glycol (200 ml.) with potassium hydroxide (20 g.) and 100% hydrazine hydrate (5 ml.), and heated under nitrogen to 200° C., the evolved vapours being allowed to cool slowly to room temperature, stirred with water (400 ml.) and filtered. The solids were washed thoroughly with water and dried, and purified by chromatography as in Example 2 to give 5ξ′-androst-3-en-17β-ol, M.P. 133 to 135° C., and 5ξ″-androst-3-en-17β-ol, M.P. 153 to 155° C.

Example 6

17α-methyltestosterone, treated by the process of Example 2, gave 17α-methyl-5ξ′-androst-3-en-17β-ol, M.P. 158 to 162° C., $[\alpha]_D^{22}$—23 (c., 0.89 in CHCl$_3$), $\gamma_{max.}$ (in CCl$_4$) 3610, 1649 (in CS$_2$) 782, 677 cm.$^{-1}$, and 17α-methyl-5ξ″-androst-3-en-17β-ol, silky needles from hexane, M.P. 121 to 123° C., $[\alpha]_D^{23}$+30° (c., 0.33 in CHCl$_3$), $\gamma_{max.}$ (in CCl$_4$), 3013, 1649 (in CS$_2$) 772, 667 cm.$^{-1}$.

Example 7

4,17α-dimethyltestosterone, treated by the process of Example 2, gave 4,17α-dimethyl-5ξ′-androst-3-en-17β-ol, flocculent mass from hexane, M.P. 127 to 129° C., $[\alpha]_D^{22}$—3° (c., 0.54 in CHCl$_3$) $\gamma_{max.}$ (in CCl$_4$) 3128, 1666 (in CS$_2$) 837, 791 cm.$^{-1}$, and 4,17α-dimethyl-5ξ″-androst-3-en-17β-ol, silky needles from aqueous methanol or hexane, M.P. 134 to 150° C., $[\alpha]_D^{20}$+28° (c., 0.49 in CHCl$_3$), $\gamma_{max.}$ (in CCl$_4$), 3028, 1660 (in CS$_2$) 783 cm.$^{-1}$.

Example 8

6α-methyl-17α-vinyltestosterone, treated by the process of Example 2, gave 6α-methyl-17α-vinyl-5ξ′-androst-3-en-17β-ol, needles from hexane, M.P. 106 to 108° C., $[\alpha]_D^{25}$—4° (c., 0.37 in CHCl$_3$), $\gamma_{max.}$ (in CCl$_4$) 3082, 3030, 1647, 1636; (in CS$_2$) 1003, 917, 779, 659 cm.$^{-1}$, and 6α-methyl-17α-vinyl-5ξ″-androst-3-en-17β-ol.

Example 9

17α-ethyl-6α-methyltestosterone, treated by the process of Example 2, gave 17α-ethyl-6α-methyl-5ξ′-androst-3-en-17β-ol, solvated crystals from methanol, M.P. 70 to 86° C. after drying in vacuo at 45° C., $[\alpha]_D^{23}$—20° (c., 0.82 in CHCl$_3$), and 17α-ethyl-6α-methyl-5ξ″-androst-3-en-17β-ol.

Example 10

19-nortestosterone, treated by the process of Example 2, gave 5ξ′-oestr-3-en-17β-ol, needles from light petroleum (B.P. 40 to 60°), 83 to 85° C., $[\alpha]_D^{22}$+29° (c., 0.73 in CHCl$_3$), and 5ξ″-oestr-3-en-17β-ol.

Example 11

17α-vinyl-19-nortestosterone, treated by the process of Example 2, gave 17α-vinyl-5ξ′-oestr-3-en-17β-ol, needles from hexane, M.P. 82 to 85° C., $[\alpha]_D^{23}$+1° (c., 0.38 in CHCl$_3$), and 17α-vinyl-5ξ″-oestr-3-en-17β-ol.

Example 12

Retrotestosterone (9β,10α-testosterone), treated by the process of Example 2 gave 5ξ′-retroandrost-3-en-17β-ol and 5ξ″-retroandrost-3-en-17β-ol.

Example 13

11α-hydroxytestosterone, treated by the process of Example 2, gave 5ξ′-androst-3-ene-11α,17β-diol, solvated needles from aqueous methanol, M.P. 85 to 90° C., raised to 138 to 144° C., after drying in vacuo at 95° C., $[\alpha]_D^{22}$—6° (c., 0.39 in CHCl$_3$), and 5ξ″-androst-3-ene-11α,17β-diol.

Example 14

11-oxo-testosterone, treated by the process of Example 2, gave 17β-hydroxy-5ξ′-androst-3-en-11-one and 17β-hydroxy-5ξ″-androst-3-en-11-one.

Example 15

9(11)-dehydrotestosterone, treated by the process of Example 2, gave 5ξ'-androsta-3,9(11)-dien-17β-ol and 5ξ''-androsta-3,9(11)-dien-17β-ol.

Example 16

16β-methyl-19-nortestosterone, treated by the process of Example 2, gave 16β-methyl-5ξ'-oestr-3-en-17β-ol and 16β-methyl-5ξ''-oestr-3-en-17β-ol.

Example 17

16α-hydroxytestosterone, treated by the process of Example 2, gave 5ξ'-androst-3-ene-16α,17β-diol and 5ξ''-androst-3-ene-16α,17β-diol.

Example 18

17α - hydroxy - 17β-methyl-D-homoandrost-4-en-3-one, treated by the process of Example 2 gave 17β-methyl-D-homo-5ξ'-androst-3-en-17α-ol and 17β-methyl-D-homo-5ξ''-androst-3-en-17α-ol.

Example 19

2α-methyltestosterone, treated by the process of Example 2 gave 2α-methyl-5ξ'-androst-3-en-17β-ol, needles from light petroleum (B.P. 40 to 60° C.) M.P. 113 to 115° C., $[\alpha]_D^{22}$+61° (c., 0.54 in CHCl$_3$), and 2α-methyl-5ξ''-androst-3-en-17β-ol.

I claim:

1. A process for the preparation of a Δ$^3$ derivative of the androstane and 19-norandrostane series and the D-homo analogues thereof from a corresponding 3-oxo-Δ$^4$-steroid comprising reacting said 3-oxo-Δ$^4$-steroid with a reagent selected from the group consisting of hydrazines and semi-carbazides to convert said steroid into a derivative selected from the group consisting of its corresponding 3-hydrazone and 3-semi-carbazone and reacting said derivative with an alkali metal hydroxide in the presence of an alcoholic solvent.

2. A process as claimed in claim 1 wherein said 3-oxo-Δ$^4$-steroid is reacted with hydrazine hydrate.

3. A process as claimed in claim 1 wherein said 3-oxo-Δ$^4$-steroid is reacted with semicarbazide hydrochloride.

4. A process as claimed in claim 1 wherein said alcohol is a polyhydric alcohol.

5. A process as claimed in claim 4 wherein said polyhydric alcohol is diethylene glycol.

6. A process as claimed in claim 4 wherein said derivative is formed in situ in said polyhydric alcohol and the resulting solution of said derivative heated with excess hydrazine and the alkali metal hydroxide.

7. 4,17α-dimethyl-5ξ-androst-3-en-17β-ol.
8. 6α-methyl-17α-vinyl-5ξ-androst-3-en-17β-ol.
9. 17α-ethyl-6α-methyl-5ξ-androst-3-en-17β-ol.
10. 5ξ-androst-3-ene-16α,17β-diol.
11. 5ξ-androst-3-ene-11α,17β-diol.
12. 17β-hydroxy-5ξ-androst-3-en-11-one.
13. 5ξ-androsta-3,9(11)-diene-17β-ol.
14. 17β-methyl-D-homo-5ξ-androst-3-en-17β-ol.

References Cited by the Examiner

UNITED STATES PATENTS

| | | | |
|---|---|---|---|
| 2,702,811 | 2/55 | Colton | 260—397.45 |
| 2,852,537 | 9/58 | Ringold et al. | 260—397.4 |
| 3,083,199 | 3/63 | Caglioti et al. | 260—239.55 |

OTHER REFERENCES

Bowers et al.: J.A.C.S., 79, pages 4556–57 (1957).

McKenna et al.: J. Chem. Soc., 1959, pages 2502–2509.

LEWIS GOTTS, *Primary Examiner*.